Figures 1, 2:
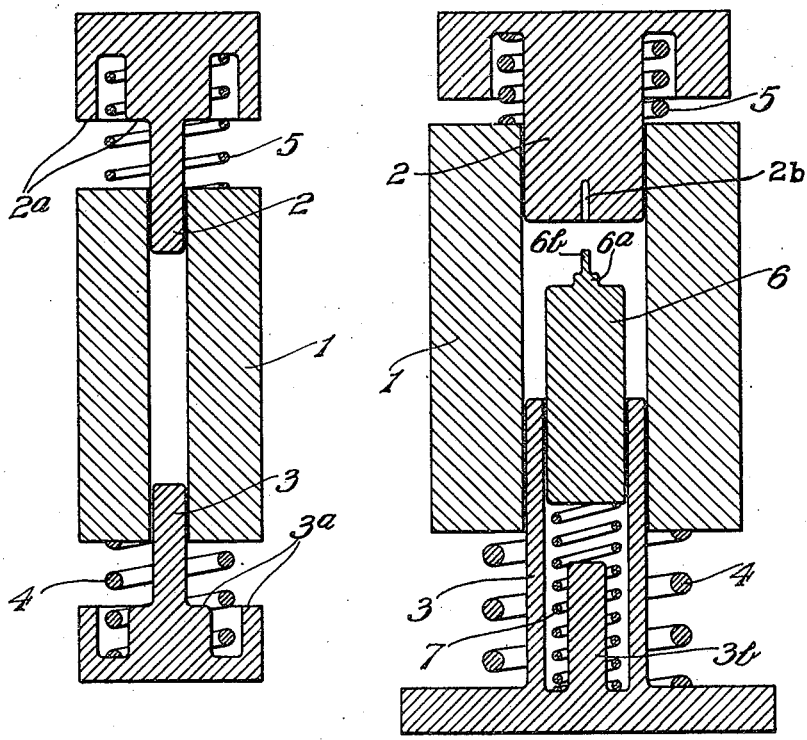

Nov. 8, 1938.　　　　V. DUMERT　　　　2,135,803

METHOD OF AND MEANS FOR MOLDING PLASTIC MATERIALS WHICH DO NOT FLOW EASILY

Filed Dec. 12, 1936

INVENTOR
VICTOR DUMERT
BY Albert C. Bell
ATTORNEY

Patented Nov. 8, 1938

2,135,803

UNITED STATES PATENT OFFICE 2,135,803

METHOD OF AND MEANS FOR MOLDING PLASTIC MATERIALS WHICH DO NOT FLOW EASILY

Victor Dumert, Finchley, London, England, assignor to Johnson Laboratories Incorporated, Chicago, Ill., a corporation of Illinois Application December 12, 1936, Serial No. 115,464
In Great Britain December 16, 1935

4 Claims. (Cl. 18—42)

This invention relates to a method of and means for molding plastic materials which do not flow easily and the invention is more especially intended to be applied to the production of "iron dust" magnetic cores.

In the molding of stiff plastic materials such as mixtures of iron dust and resin by endwise pressure, it is ordinarily impossible to obtain uniform density of the finished product. The finished moldings produced by the methods hitherto in use are always denser at one end than at the other. Moreover, the results obtained are irregular, some moldings showing a much greater density variation than others. In extreme cases a small part of the molding may be compressed to a much greater density than is required, whilst the remainder is hardly compressed at all.

In accordance with my invention, in order to obtain a molding having a more uniform density than is obtained by the methods hitherto in use, I compress the material in a mold by the action of two plungers which enter the mold from opposite ends, the mold being movable endwise during the process of compression so as to maintain a balance between the degree of compression at the two ends of the molding.

By mounting the mold in a floating manner, i. e. so that it can move in either direction in response to an unbalanced thrust, it is possible to produce moldings which are more homogeneous than the best moldings obtainable by the application of pressure to one end of the mold only. I have found, however, that a freely floating mold does not always give satisfactory results. In spite of the balance between the compressive forces applied at opposite ends of the mold, it frequently happens that one of the plungers sticks, whilst the other plunger continues to move relatively to the mold and when this occurs the finished molding is found to have an abnormal density distribution. In order to obtain more consistent results, therefore, I prefer to control the movements of the mold by means of a spring or springs in such a way as to ensure that the two plungers work together. The manner of employing such spring or springs will be understood from the following description with reference to the accompanying drawing in which:—

Figure 1 is a sectional view of the working parts of a molding appliance constructed according to the invention and, Figure 2 is a similar view of a modified construction.

The mold shown in Figure 1 of the drawing which is intended for producing cylindrical moldings, comprises a cylindrical mold body 1 and two plungers 2 and 3 which are adapted to enter the body 1 from opposite ends so as to compress the plastic material between them. The plungers 2 and 3 are adapted to be moved relative to said mold body 1 and towards each other by any suitable press mechanism, not shown.

The mold body 1 receives a predetermined quantity of plastic material and the press mechanism is arranged to force the plunger 2 down to a predetermined position in relation to the lower plunger 3 so as to compress the charge of plastic material to a predetermined extent. During the process of compression the mold body 1 moves downwards under the pressure transmitted from the plunger 2 to the mold 1 due to the friction between the material in the mold and the cylindrical wall of the mold. The movement of the mold body is controlled by the springs 4 and 5 between said body and the plungers 3 and 2 respectively, which springs must each be stiff enough to prevent the mold from sticking to the plunger 2 and moving bodily therewith at any stage in the compression process.

For short moldings, for example, cylindrical moldings half an inch long by three eighths of an inch in diameter, it is found that the mold does not stick to the lower plunger 3 so that the spring 5 does not then materially assist the downward movement of the mold body 1. The action of the spring 4 which prevents the mold from sticking to the upper plunger 2 and moving bodily therewith is sufficient in such cases to ensure consistent results. The strength of the spring 4 must, of course, be suited to the nature of the material being molded and the dimensions of the molding. The spring must be stiff enough to prevent the mold from sticking to the plunger 2, but not so stiff as to prevent the mold from moving downwards as the compression proceeds. The stiffness of each of the springs 4 and 5 must be such that each of the plungers 2 and 3 will move inwards relatively to the mold throughout the molding process, where substantially uniform density of the molding is desired.

If the length of the molding is increased in relation to the diameter, the finished molding tends to be denser at the upper end i. e. the end near the plunger 2, and this tendency becomes more pronounced as the length of the molding is increased in relation to its diameter.

For moldings having a greater ratio of length to diameter than 8–3, and also for shorter moldings when the desired density distribution cannot otherwise be uniformly obtained, the mold body 1 is controlled by the two springs 4 and 5 respectively preventing sticking between the mold body and plungers 2 and 3. The appliance consisting of the mold body 1, the plungers 2 and 3 and springs 4 and 5 may conveniently be constructed as a self-contained unit adapted to be inserted into any suitable form of press by means of which the plungers 2 and 3 can be forced towards one another. The movements of the plungers are limited by means of stops 2a and 3a thereon which abut against the ends of the mold body 1 when the mold is fully closed.

For a cylindrical molding in which it is desired to obtain as nearly as possible uniform density from end to end, the springs 4 and 5 will be similar to one another and will have the effect of causing the plungers to enter the mold body 1 at substantially equal rates throughout the process of compression. Where it is desired to produce a molding denser at one end than the other, however, one of the springs 4 or 5 will be made weaker than the other. For example, if the upper spring 5 is made weaker than the lower spring 4, as shown in the drawing, the upper plunger 2 will have a longer stroke than the lower plunger 3 and the finished molding will be denser at its upper end. The relative lengths of the plungers 2 and 3 must of course be such that the stops 2a and 3a will abut against the ends of the mold body 1 simultaneously or nearly so. The relative lengths of the plungers as well as the relative strengths of the springs 4 and 5 must therefore be chosen according to the degree of variation of density required, the longer plunger and the weaker spring being placed at the end where the density of the finished mold has to be the greater. In all cases, the springs must be sufficiently stiff to ensure that neither plunger will stick to the mold at any stage in the process of compression. Marked irregularity in the results obtained indicates that the springs are not sufficiently stiff.

The construction of the mold body 1 and plungers 2 and 3 may be modified to enable cores of different shapes to be produced. For example, moldings having a greater diameter at one end than the other may be made. Where a mold is of greater diameter at one end than at the other, it will usually be found that the spring acting on the end of the mold whose diameter is smaller must be stiffer than the spring acting on the other end of the mold.

Figure 2 of the drawing shows a molding appliance according to the invention adapted for producing a cup-shaped molding. The device comprises an open ended cylindrical mold body 1 similar to that shown in Figure 1 and two plungers 2 and 3 adapted to be thrust into the mold body from opposite ends in the manner described with reference to Figure 1. The body 1, which is free to move endwise during the compression, is controlled by springs 4 and 5 whose action is similar to that described with reference to Figure 1.

The plunger 3 carries a core 6 which is mounted to slide in a cylindrical bore in the plunger 3 and is controlled by a spring 7. The spring 7 causes the core 6 to enter deeply into the charge during the early stages of compression and the length and stiffness of this spring is so chosen as to ensure that the core 6 will drive out the excess material from between the ends of the core 6 and the plunger 2 at an early stage, before the material has become so compressed as to be practically non-flowing. The need for excessive pressures such as would be required to drive practically non-flowing material from the end part into the cylindrical wall part of the molding is thus avoided. When the core 6 has reached its final position, the plunger 3 follows up, its movement being ultimately arrested by the engagement of a stop 3b on the plunger with the end of the core. A central projection 6a is formed on the end of the core 6 for the purpose of producing a hole through the bottom of the finished molding, and the projection 6a carries a pin 6b projecting axially therefrom and adapted to enter a hole or recess 2b in the plunger 2. By the action of the pin 6b the material is forced out from between the faces of the projection 6a and plunger 2 so as to permit the hole to be formed. If the pin 6b were omitted, the material would become tightly packed between the faces of the projection 6a and plunger 2 and would prevent these faces from meeting.

Having thus described my invention, what I claim is:

1. The method of molding plastic materials which do not flow easily, consisting of placing a charge of the material to be molded in a mold open at opposite ends and supported for endwise movement, simultaneously imparting substantially equal compressive forces to opposite ends of said charge, and applying longitudinally and simultaneously to the mold opposite external forces each sufficient to overcome sticking of the charge in the mold, thereby maintaining said compressive forces substantially equal to each other throughout the compression of the charge.

2. An appliance for molding plastic materials which do not flow easily, including in combination an open ended mold body for receiving a charge to be compressed, and two plungers movable relative to said mold body and towards each other in opposite ends of the mold in said mold body to compress a charge in said mold, said mold body being supported for axial movement equalizing the compressive effects of said plungers on said charge, and two opposed springs acting longitudinally on said mold body and each of a strength overcoming sticking of the charge in the mold.

3. The method of molding plastic materials which do not flow easily, consisting of placing a charge of the material to be molded in a mold open at opposite ends and supported for endwise movement, simultaneously imparting substantially equal compressive forces to opposite ends of said charge, applying longitudinally to the mold opposite external forces each sufficient to overcome sticking of the charge in the mold, thereby maintaining said compressive forces substantially equal to each other throughout the compression of the charge, and increasing said external forces as the compression of the charge progresses.

4. The method of molding plastic materials which do not flow easily, consisting of placing a charge of the material to be molded in a mold open at opposite ends and supported for endwise movement, simultaneously imparting substantially equal compressive forces to opposite ends of said charge, applying longitudinally to the mold opposite external forces each sufficient to overcome sticking of the charge in the mold, thereby maintaining said compressive forces substantially equal to each other throughout the compression of the charge, and increasing said external forces as the compression of the charge progresses and proportionally to the compression of the charge.

VICTOR DUMERT.